United States Patent [19]

White

[11] 4,230,326
[45] Oct. 28, 1980

[54] SEALING ASSEMBLY FOR BALL OR ROD MILLS AND THE LIKE

[75] Inventor: Leonard D. White, Vancouver, Canada

[73] Assignee: Lister Bolt & Chain Ltd., Richmond, Canada

[21] Appl. No.: 934,652

[22] Filed: Aug. 17, 1978

[51] Int. Cl.³ .......................... F16L 5/02; F16L 59/12
[52] U.S. Cl. ............................................ 277/166; 16/2
[58] Field of Search ........................ 277/166, 211; 16/2

[56] References Cited

U.S. PATENT DOCUMENTS

| | | |
|---|---|---|
| 1,453,505 | 5/1923 | Kendall . |
| 2,339,549 | 1/1944 | Kubaugh . |
| 2,949,325 | 8/1960 | Nenzell . |
| 2,981,232 | 4/1961 | Peras . |
| 3,247,752 | 4/1966 | Greenleaf et al. .................... 277/166 |
| 3,399,589 | 9/1968 | Breed ................................... 277/166 |
| 3,422,721 | 1/1969 | Yonkers ............................... 277/166 |
| 3,464,309 | 9/1969 | Kilmarx . |
| 3,836,183 | 9/1974 | Battle .................................. 277/211 |
| 3,973,789 | 8/1976 | Kunz ........................................ 16/2 |

Primary Examiner—Robert I. Smith
Attorney, Agent, or Firm—Townsend and Townsend

[57] ABSTRACT

An annular seal and a metal washer form a sealing assembly for a bolt fitted to a machine subject to vibrations and other forces likely to cause conventional seals to fail. The resilient or deformable seal has a central opening defined by a peripheral sealing edge. The circumference of the seal is bevelled to provide other sealing edges. There are sealing beads on opposite faces of the seal near both the opening and the bevelled edges. The relatively non-deformable washer is adapted to bear against the seal and clamp it to a surface of the machine when a nut is tightened on the bolt. This washer has a central opening and an inner face extending to an inclined sealing edge opposing a peripheral sealing edge of the seal. The arrangement is such that the annular seal when compressed effectively stops the leakage of water and particulate material through the bolt hole.

10 Claims, 8 Drawing Figures

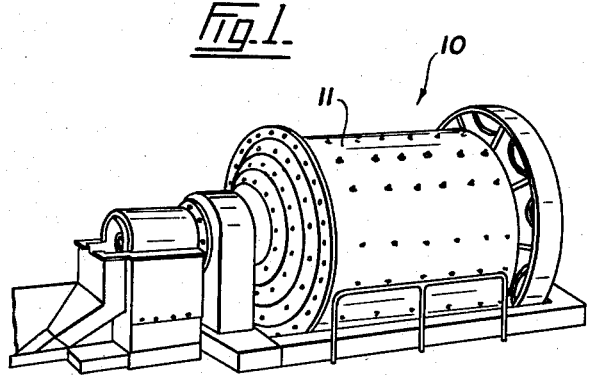
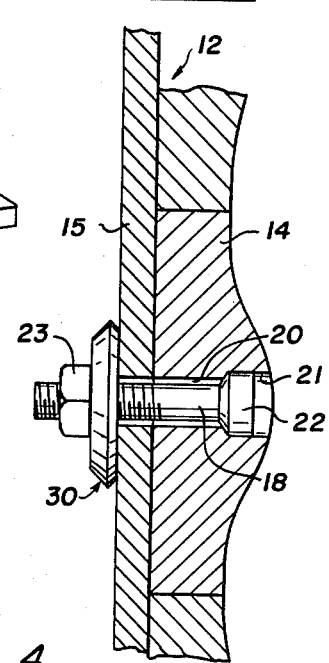
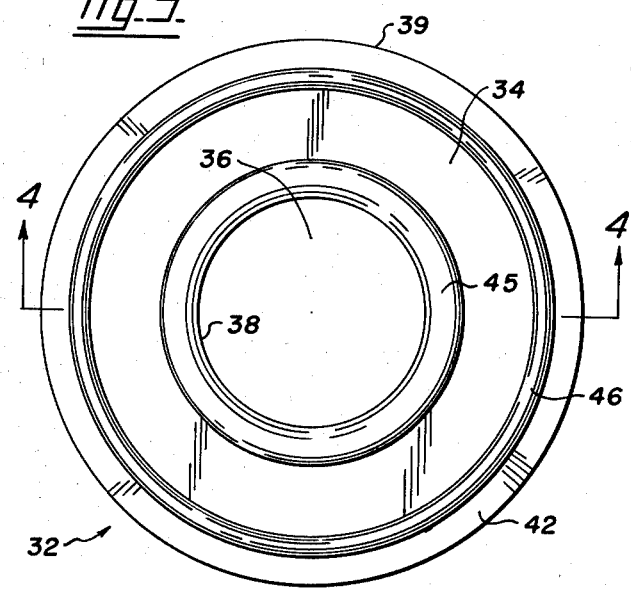
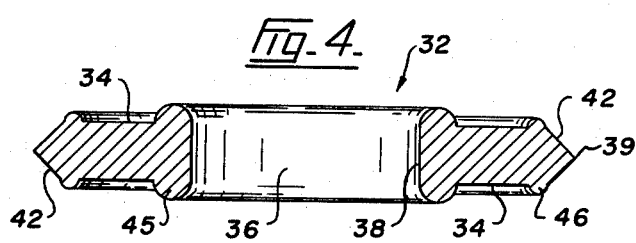

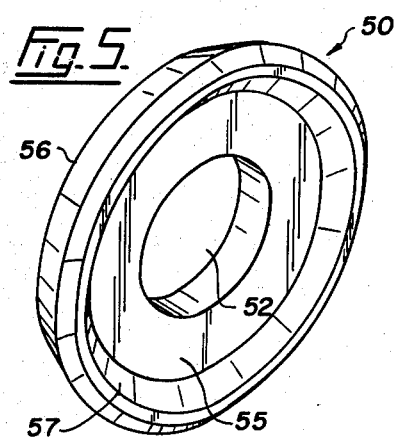
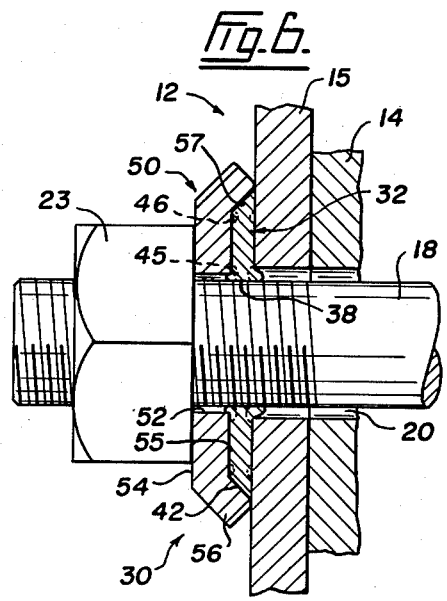
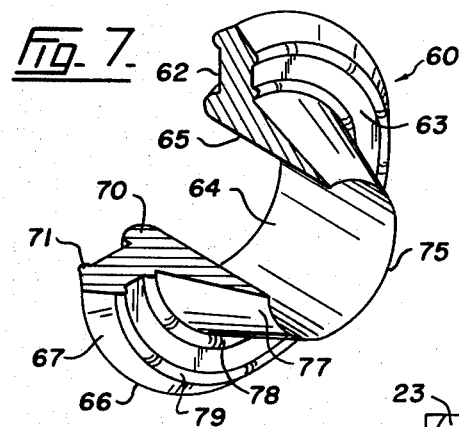
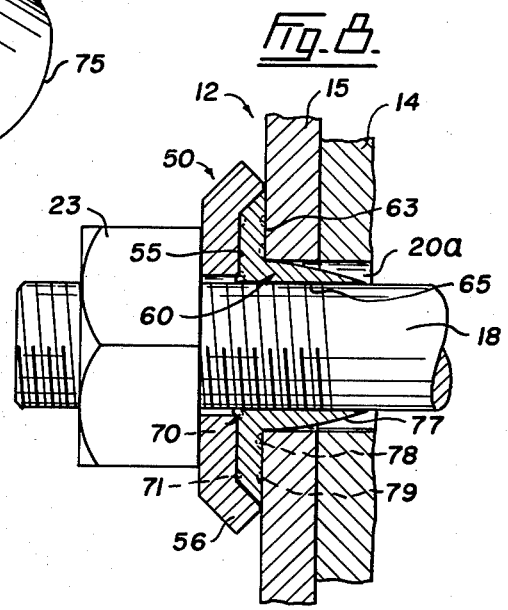

SEALING ASSEMBLY FOR BALL OR ROD MILLS AND THE LIKE

BACKGROUND OF THE INVENTION

This invention relates to a sealing assembly which is particularly intended for use on equipment employed by the mining and cement industries.

Machines such as a ball mill used to grind ore presents special sealing problems due mainly to the excessive vibrations which is encountered and the presence of highly abrasive material in the water which tends to escape through various wall openings. When conventional sealing means are used, it is not long before the abrasive slurry contained in the mill finds its way out and drops out onto walkways and other areas near the machine. As a result, there is a clean-up problem which requires the attention of one or more workmen and eventually the problem worsens to the extent that the mill must be shut down for a lengthly period to allow the leaking seals to be replaced.

SUMMARY OF THE INVENTION

The present invention solves a sealing problem of the foregoing type by providing an assembly which consists of a rubber-type seal and a metal washer. These two simply constructed parts co-operate to provide a positive and long-lasting seal which greatly reduces the cost of maintaining and operating ball or rod mills as well as cement grinders and the like.

According to one embodiment of the invention, there is provided a sealing assembly for use on a bolt projecting through a hole in a wall enclosing slurry or the like which comprises an annular seal formed of a deformable material adapted to be inserted over the bolt into contact with an outer surface of the wall, said annular seal having a central opening boardered by a peripheral sealing edge and an outer face encircled by a bevelled sealing edge, and a substantially non-deformable washer adapted to be fitted to the bolt to bear against the outer face of the annular seal, said washer having an inner face and an inclined sealing edge, said annular seal being compressed against the outer surface of the wall and extruded radially towards the bolt in response to a clamping force applied when a nut is tightened on the bolt to wedge the inclined sealing edge against the bevelled sealing edge whereby the peripheral sealing edge is forced into slurry-tight engagement with the bolt.

Another embodiment of the present invention contemplates the use of an annular seal having an inwardly projecting and cross sectionally tapered sleeve near the peripheral sealing edge, said sleeve being enterable into the bolt hole and providing an extension of the peripheral sealing edge.

BRIEF DESCRIPTION OF THE DRAWING

FIG. 1 is a perspective view of a ball mill fitted with the present sealing assembly, FIG. 2 is an enlarged vertical section of a wall of the ball mill showing a sealing assembly in position of use, FIG. 3 is a plan view of an annular seal of the present assembly, FIG. 4 is a transverse section taken on the line 4—4 of FIG. 3, FIG. 5 is a perspective view of a washer forming part of the sealing assembly, FIG. 6 is a vertical section showing the sealing assembly in position of use, FIG. 7 is an isometric quarter section showing a modified form of annular seal, and FIG. 8 is a vertical section showing the annular seal of FIG. 6 in position of use.

DESCRIPTION OF THE PREFERRED EMBODIMENTS

Referring first to FIG. 1, the numeral 10 indicates generally a ball mill which provides a good example of where it is advantageous to use the present invention. This type of mill is widely used in the mining industry to reduce ores to a slurry as one step in the milling process. The mill includes a hollow drum 11 which is partly filled with steel grinding balls and ore (not shown) so that, when the drum is rotated, the required grinding action takes place.

In FIG. 2, the drum 11 will be seen to have a cylindrical wall 12 which is formed of a liner 14 and a shell 15. A typical liner 14 is constructed of heavy metal wear plates each of which is secured to the relatively thin metal liner by a number of suitably spaced bolts 18. To receive such a bolt, the wall 12 is provided with a hole 20 which usually is about one quarter of an inch larger in diameter than the shank of the bolt. The liner plates are recessed as at 21 to receive the head 22 of the bolt which is then held against rotation about its longitudinal axis. A nut 23 is fitted to the bolt to clamp an assembly against the outer surface of the drum wall so that the hole 20 is properly sealed against the liquified contents of the drum.

The sealing assembly which forms the basis of the present invention is indicated generally by the numeral 30 and, in FIGS. 3 and 4, one part of this assembly is shown to comprise an annular seal 32. The seal generally indicated at 32 is formed of a synthetic rubber and styrene butadiene having a hardness of 70 durometer S.B.R. has been found to be particularly well suited for the purpose. The material provides a seal which is flexible and tough and therefor is capable of being altered in shape when installed in position of use. The seal 32 has opposite, parallel faces 34. A circular hole 36 in the seal provides a flat, peripheral sealing edge 38 which is concentric to circumference 39 of the seal. Between the circumference 39 and the opposite face 34, the seal is bevelled to provide sealing edges 42 which are at 90° to one another. Circular beads 45 integrally formed with the seal are located on the faces 34 at the edge 38. Similarly formed circular beads 46 join the bevelled sealing edges 42 and the opposite faces 34 of the annular seal. The beads 45 and 46 are semi-circular in cross section and the radius of the former bead is substantially twice that of the latter bead.

It will be noted that the annular seal 32 is provided with two bevelled sealing edges 42 although only one such edge is required for reasons which will be made apparent later. The beads 45 and 46 on one of the faces of the seal might be dispensed with in some installations but, preferably, the seal is made symmetrical or identical on either side as described and illustrated so that it can be used with either face 34 towards the wall 12 thus avoiding the possibility of being incorrectly installed.

The sealing assembly 30 also includes a washer 50 which is best shown in detail FIGS. 5 and 6. The substantially cup-shaped washer generally indicated at 50 is made of a ductile iron which is heat treated so as to be capable of resisting failure through fracture, bending, deformation or fatigue under torque or impact loadings. Such a washer is extremely durable and is reusable over and over again. A central opening 52 in the washer has a diameter only slightly smaller than the diameter of the bolt hole 20. Outer and inner faces 54 and 55 of the washer are parallel and a rim 56 of this seal-retaining member is inwardly turned to provide an inclined sealing edge 57 which is disposed at an included angle of 135° with respect to the inner face 55. This angle was arrived at by careful experimentation and is a function of the thickness of the seal 32, the relative hardness of the seal and the washer, and the torque values which are intended to be used on a particular size and grade of bolt 18.

The sealing action achieved by this invention can best be understood with reference to FIG. 6 which shows the nut 23 fully tightened on the bolt 18 with the assembly 30 interposed between the nut and the outer face of the wall 12 of the ball mill. Sufficient torque is applied to the nut to bring the washer into contact with the outer surface of the wall 12 and the resulting compressive force exerted on the seal 32 flattens and traps this resilient member beneath the cup-shaped washer. As a result, the seal is distorted and compressed and this results, amongst other things, in the rubber-like material being forced towards the bolt so that the sealing edge 38 is clamped firmly around the circumference of the bolt to stop leakage at this point. The pressure applied to the seal is such that the edge 38 is forced into the threads on the bolt whereupon the sealing action is positive. The circular beads 45 and 46 on the inner face of the seal are flattened against the wall 12 to exert maximum pressures which stops slurry leaking out between the seal and the wall. The corresponding beads on the outer face of the seal block leakage of the slurry into the opening 52 and towards the abutting edges 42 and 57. The several beads increase the density of the seal in their immediate vicinity to further improve the sealing action.

As previously mentioned, the grinding action of the ball mill is accompanied by a great deal of vibration and some of this vibrational force is transmitted to the bolt and washer. Since the ductile washer 50 bears against the wall 12, the seal 32 is prevented from bouncing which might reduce the effectiveness of the assembly. Thus, the water and finer particles of ore which make up the slurry within the mill cannot work its way past the tightly-clamped peripheral sealing edge 38 at least until the mill has been in operation for some time and wear occurs in the bolt 18 or adjacent parts of the drum. The inwardly turned rim 56 in the washer and the provision of the 45° face 57 ensures that the seal is squeezed radially towards the bolt so that the edge 38 is molded around and forced into the threads on the bolt, one bead 45 being extruded into the hole 20 and the opposite bead 45 being forced a lesser distance into the smaller opening 52 in the washer. It will be noticed that one of the bevelled edges 42 disappears as a result of the compressive force which is applied to the seal. Two bevelled edges 42, therefore, are not absolutely essential on the seal 32.

Referring now particularly to FIG. 7, the numeral 60 indicates generally a modified form of seal which can be used with the washer 50. This seal 60 has outer and inner faces 62 and 63, a central opening 64 defined by a peripheral sealing edge 65, and a circumference 66 bordered by bevelled sealing edges 67. There is a circular bead 70 on the outer face of this seal. Another relatively small radius bead 71 is located on the outer face 62 near the adjacent bevelled sealing edge 67.

The inner face 63 is provided with an integrally formed flange-like sleeve 75 which is tapered in cross section. Thus, the sleeve extends or elongates peripheral sealing edge 65 which is clamped to the bolt as will be described later. The sloping side 77 of the sleeve is encircled by a bead 78 formed on the inner face 63 and, preferably, this bead is of the same radius as the adjoining bead 71. Another bead 79 is provided on the face 63 opposite the bead 71.

The seal 60 is shown in position of use in FIG. 8 which shows a hole 20a enlarged by extensive wear so that a seal 32 is no longer entirely effective. When wear of this magnitude is encountered, the seal 60 is employed since the sleeve 75 enters the hole for a short distance at least to increase the sealing action. The seal 60 is compressed or clamped between the washer 60 and the wall 12 and the elongated edge 65 is pressed firmly into contact with the bolt 18. The compressed beads 79 and 78 seal against the outer surface of the wall 12. In a like manner, the beads 70 and 71 seal against the inner face 55 of the washer so that there is little likelihood of slurry leaking out of the oversize hole.

From the foregoing, it will be apparent there is provided a particularly effective sealing assembly for a machine such as a ball mill which is subjected to heavy vibration and extensive wear. The plates 14 eventually wear down to a point where they must be replaced and it is good policy to replace the nuts and bolts as well at this time. Of course, the seals 32 are replaced as well and the washers 50 can be used repeatedly to reduce maintenance costs. Occasionally, excessive wear may be allowed to develop between overhauls at least to the extent that the bolt hole in the mill wall is enlarged or distorted but it is a simple matter to substitute a seal 60 for a seal 32 if such wear does occur.

We claim:

1. A sealing assembly for use on a bolt projecting through a hole in a wall enclosing slurry or the like and comprising an annular seal formed of a deformable material adapted to be inserted over the bolt into contact with an outer surface of the wall, said annular seal having a central opening bordered by a peripheral sealing edge and an outer face encircled by a bevelled sealing edge, the outer face and the sealing edge defining between them an included angle greater than 90°, and a substantially non-deformable washer adapted to be fitted to the bolt to bear against the outer face of the annular seal, said washer having an inner face and an inwardly inclined sealing edge shaped to engage the bevelled sealing edge of the annular seal, so that said annular seal can be compressed against the outer surface of the wall and extruded radially towards the bolt in response to a clamping force applied when a nut is tightened on the bolt to wedge the inclined sealing edge against the bevelled sealing edge whereby the peripheral sealing edge is forced into slurry-type engagement with the bolt.

2. A sealing assembly as claimed in claim 1, in which said annular seal has an inwardly projecting and cross sectionally tapered sleeve adjacent the peripheral sealing edge, said sleeve being enterable into the bolt hole and providing an extension of the peripheral sealing edge.

3. A sealing assembly as claimed in claim 2, in which said outer face of the annular seal has an outwardly projecting circular beads one adjacent the peripheral sealing edge and another adjacent the bevelled sealing edge.

4. A sealing assembly as claimed in claim 3, in which said inclined sealing edge of the washer is inclined with respect to the inner face of said washer at an included angle of substantially 135°.

5. A sealing assembly according to claim 1 wherein the inclined sealing edge of the washer is shaped to engage the outer surface of the wall when subjected to the clamping force generated by the nut tightened on the bolt so as to encapsulate the annular seal with the washer.

6. A sealing assembly for use on a bolt projecting through a hole in a wall enclosing slurry or the like and comprising an annular seal formed of a deformable material and adapted to be inserted over a projecting end of the bolt into contact with an outer surface of the wall; said annular seal having a central opening bordered by a peripheral sealing edge, parallel inner and outer faces, and bevelled sealing edges extending from said inner and outer faces to a circumference of said seal; a first bead projecting beyond each of the inner and outer faces adjacent the peripheral sealing edge, a second bead projecting beyond each of the inner and outer faces adjacent the bevelled sealing edges, and a substantially non-deformable washer adapted to be fitted to the bolt end to bear against the annular seal, said washer having a flat inner face parallel to the outer face of the annular seal and an inclined sealing edge disposed at an included angle of substantially 135° to said inner face, said annular seal being compressed against the outer surface of the wall and extruded radially towards the bolt by the inclined sealing edge in response to a clamping force applied when a nut is tightened on the bolt whereby the the peripheral sealing edge and portions of the first beads are wedged into slurrytype engagement with the threads of the bolt and additional sealing pressure is applied in the vicinity of the second beads.

7. A sealing assembly as claimed in claim 6, in which an included angle between said bevelled sealing edges of the annular seal is substantially 90°.

8. A sealing assembly as claimed in claim 6, in which said annular seal is formed of styrene butadiene having a hardness of approximately 70 durometer S.D.R.

9. A sealing assembly as claimed in claim 6, in which said washer is formed of a ductile cast iron.

10. A sealing assembly as claimed in claim 6, in which said first beads have cross sectional dimensions substantially twice the corresponding dimensions of the second beads.

* * * * *